(12) United States Patent
Gu

(10) Patent No.: US 7,766,686 B2
(45) Date of Patent: Aug. 3, 2010

(54) PLUGGABLE FORM FACTOR RELEASE MECHANISM

(75) Inventor: Xiao-Bai Gu, Cupertino, CA (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 367 days.

(21) Appl. No.: 12/008,094

(22) Filed: Jan. 7, 2008

(65) Prior Publication Data

US 2009/0176401 A1    Jul. 9, 2009

(51) Int. Cl.
*H01R 13/62* (2006.01)
(52) U.S. Cl. ...................................... 439/372
(58) Field of Classification Search ................ 439/160, 439/372; 361/727–729; 385/53–55
See application file for complete search history.

(56) References Cited

U.S. PATENT DOCUMENTS

| | | | |
|---|---|---|---|
| 6,371,787 B1 | 4/2002 | Branch et al. | |
| 6,439,918 B1 | 8/2002 | Togami et al. | |
| 6,519,160 B1 | 2/2003 | Branch et al. | |
| 6,533,603 B1 * | 3/2003 | Togami | 439/372 |
| 6,538,882 B2 | 3/2003 | Branch et al. | |
| 6,666,484 B1 | 12/2003 | Branch et al. | |
| 6,692,159 B2 | 2/2004 | Chiu et al. | |
| 6,744,963 B2 | 6/2004 | Hwang | |
| 6,746,158 B2 | 6/2004 | Merrick | |
| 6,746,264 B1 | 6/2004 | Branch et al. | |
| 6,789,958 B2 | 9/2004 | Ahrens et al. | |
| 6,796,715 B2 | 9/2004 | Chiu et al. | |
| 6,840,680 B1 * | 1/2005 | Chiu et al. | 385/53 |
| 6,883,971 B2 | 4/2005 | Chiu et al. | |
| 6,890,206 B2 | 5/2005 | Distad et al. | |
| 6,916,196 B2 | 7/2005 | Long et al. | |
| 6,929,403 B1 * | 8/2005 | Arciniegas et al. | 385/55 |
| 6,974,265 B2 | 12/2005 | Chiu et al. | |
| 7,004,647 B2 | 2/2006 | Malagrino et al. | |
| 7,066,746 B1 | 6/2006 | Togami et al. | |
| 7,066,765 B2 * | 6/2006 | Togami et al. | 439/607.24 |
| 7,077,686 B2 * | 7/2006 | Seo et al. | 439/372 |
| 7,083,336 B2 * | 8/2006 | Kim et al. | 385/92 |
| 7,090,527 B2 * | 8/2006 | Hanley et al. | 439/372 |
| 7,114,984 B2 | 10/2006 | Shark et al. | |
| 7,118,281 B2 * | 10/2006 | Chiu et al. | 385/53 |
| 7,186,134 B2 * | 3/2007 | Togami et al. | 439/484 |
| 7,189,013 B2 | 3/2007 | Yang et al. | |

(Continued)

FOREIGN PATENT DOCUMENTS

AT    366509 T    7/2007

(Continued)

*Primary Examiner*—James Harvey
(74) *Attorney, Agent, or Firm*—Norman Stephan Kinsella; Grossman, Tucker, Perrault & Pfleger PLLC

(57) ABSTRACT

Briefly, various embodiments of a pluggable form factor release mechanism are described. For example, but without intending to limit the scope of claimed subject matter, a transceiver module may include the following: a module housing; a bail lever; an actuator; and a spring adjacent to the actuator. The bail lever and the actuator may be movably connected to the module housing in such a manner so that pivoting the bail lever away from the housing engages an end of the actuator to move towards the module housing. The actuator may rotate about a fulcrum with an opposing end of the actuator moving away from the module housing.

13 Claims, 21 Drawing Sheets

U.S. PATENT DOCUMENTS

| | | | |
|---|---|---|---|
| 7,204,712 B2 | 4/2007 | Schwiebert et al. | |
| 7,212,410 B2 | 5/2007 | Larson | |
| 7,220,066 B2 | 5/2007 | Kim et al. | |
| 7,264,406 B1 | 9/2007 | Yoshikawa | |
| 2005/0196109 A1 | 9/2005 | Kim et al. | |
| 2007/0149005 A1 | 6/2007 | Togami et al. | |
| 2008/0314099 A1* | 12/2008 | Yu | 70/275 |
| 2009/0176401 A1* | 7/2009 | Gu | 439/372 |

FOREIGN PATENT DOCUMENTS

| | | |
|---|---|---|
| AT | 368874 T | 8/2007 |
| DE | 10055683 | 5/2002 |
| DE | 60221037D | 8/2007 |
| EP | 1396099 | 3/2004 |
| EP | 1452079 | 9/2004 |
| EP | 1555556 | 2/2005 |
| EP | 1730565 | 12/2006 |
| EP | 1855133 | 11/2007 |
| WO | WO02073750 | 9/2002 |
| WO | WO02084903 | 10/2002 |
| WO | WO03051094 | 6/2003 |
| WO | WO03060583 | 7/2003 |
| WO | WO03098750 | 11/2003 |
| WO | WO2005093482 | 10/2005 |

* cited by examiner

PLUGGABLE FORM FACTOR RELEASE MECHANISM

FIELD

This disclosure relates to a mechanism to release a pluggable form factor from a host receptacle or cage, such as for an optical transceiver.

BACKGROUND

Optical networks continue to be deployed that provide improved performance in terms of bandwidth and transmission speeds. An aspect of this performance improvement relates to increasing reductions in size for components employed in such networks, one example being optical transceivers. The evolution of today's optical transceivers has been driven by multi-source agreements (MSAs). These agreements establish various standards or specifications for optical and electrical characteristics, pin functions and for other aspects of module form factors for optical transmitters and receivers. For example, standardized features of a so-called SFP, which is a small pluggable form factor, are provided. However, many aspects of optical transceivers are not standardized, including mechanisms for engaging or disengaging a transceiver from a host receptacle or cage for a line card of a switch, for example. Therefore, innovations continue to be developed to make such mechanisms more robust, easier to assemble and easier to manufacture.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and/or advantages thereof, may best be understood by reference of the following detailed description if read with the accompanying drawings in which:

DETAILED DESCRIPTION

Figure 1:
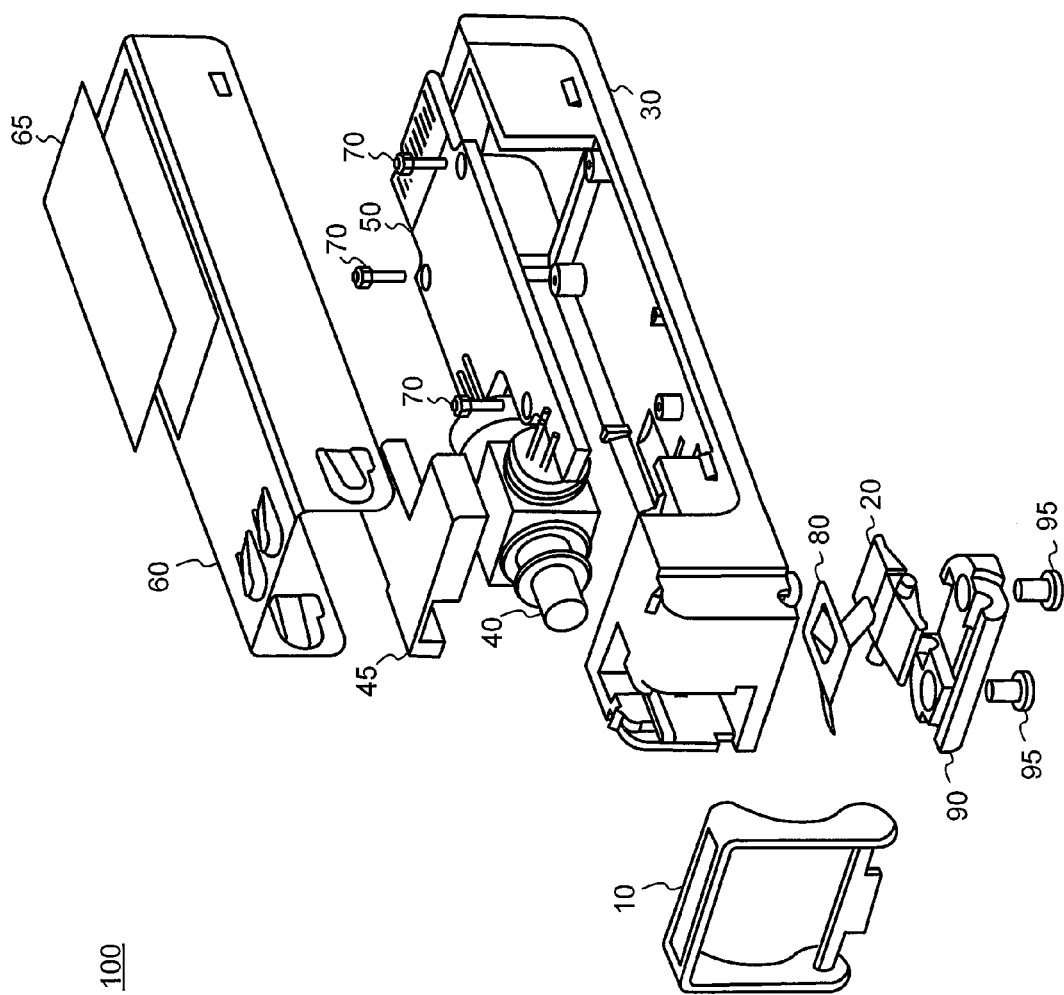
FIG. 1 is an exploded perspective view of an embodiment of a transceiver module.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

As previously indicated, a pluggable transceiver is typically inserted into a cage of a host system, also referred to herein as a host receptacle. The cage or receptacle may comprise, for example, a metal housing with one end thereof having an opening to the outside. This cage may be installed on a host system such that an electrical connector on the host system is set in the deep end of the cage, and the opened end is exposed in the face panel of the host system. Thus, a pluggable transceiver in such an arrangement may be inserted into a cage from the face panel and an electrical plug may be provided in the rear end of the transceiver to mate with an electrical connector in the deep end of the cage.

In particular, in this context, if an optical transceiver is capable of being inserted into or extracted from a receptacle without shutting down the host system, it is referred to as being a pluggable transceiver or a hot pluggable transceiver. It is also desirable for a pluggable transceiver to provide a mechanism for latching to and de-latching from with the cage or receptacle. If the optical transceiver mates with the receptacle, the transceiver should be secure so that it is not released from the cage until release is desired. Various latching and release mechanisms have been proposed and disclosed.

Although claimed subject matter is not limited in scope in this regard, in one particular embodiment, a transceiver module includes a module housing, a bail lever, and an actuator. The bail lever and actuator are movably connected to the module housing in such a manner that pivoting the bail lever away from the housing engages an end of the actuator to move towards the module housing so that the actuator rotates about a fulcrum with an opposing end of the actuator moving away from the module housing. The transceiver module may comprise a form pluggable transceiver module and capable of being disengaged from a host receptacle. The module housing may also have a cover for the module housing. The bail lever may be pivotally connected to the module housing and the actuator may comprise a seesaw actuator rotatably connected to the module housing about a fulcrum, as described in more detail below.

For this particular embodiment, the bail lever and seesaw actuator are positioned relative to each other so that pivoting of the bail lever away from the module housing results in an extending projection of the bail lever to be engaged surface-to-surface against one end of said seesaw actuator. The bail lever and seesaw actuator are further positioned relative to each other so that further pivoting beyond the surface-to-surface engagement exerts a downward force on the one end of the actuator resulting in rotation of the actuator about the fulcrum and exertion of an upward force by an opposite end of the actuator so as to contact and flex a latching extension of the host receptacle away from the module housing to thereby de-latch the module housing from the host receptacle. It is also noted that in an embodiment the module housing may be oriented so as to receive a printed circuit board to be mounted within the module housing in a Z-drop configuration, as discussed in more detail later.

FIG. 1 is an exploded perspective illustration of an embodiment 100 of a form pluggable transceiver (hereinafter denoted as "transceiver") viewed from the bottom thereof. Embodiment 100 comprises embodiments of various components, including a bail lever 10, a seesaw actuator 20, a module housing 30, an optical sub-assembly (OSA) 40, a printed circuit board 50, and a module housing cover 60. For this particular embodiment, also depicted are fasteners 70 for the printed circuit board, a spring 80 and an actuator cover 90 with fasteners 95. Likewise, cover 60 may include a label 65 and a cover 45 to provide additional protection to OSA 40. It is, of course, understood that claimed subject matter is not limited in scope to embodiment 100 or to these component embodiments. For example, some embodiments may exclude spring 80, as explained in more detail later. Likewise, hereinafter, other embodiments of a bail lever, for example, shall be described.

A side of a transceiver module, such as the one illustrated in FIG. 1, for example, adjacent to bail lever 10 is here called the front, while the opposite side is here called the rear or back. Likewise, in FIG. 1, the side where actuator 20 is provided is called the bottom or bottom side. The side opposite thereto, is called as the top or top side. These sides are in accordance with the orientation for transceiver 100 being inserted into a cage or receptacle. The rear of the transceiver is inserted into the cage, and typically mates with a connector installed within the cage, as mentioned previously. The front side therefore is exposed from the opening of the face panel of the host system. It is noted that terms such as top, bottom, rear and front are not intended to limit use of the transceiver module to a particular spatial orientation during operation and are employed here merely for discussion purposes.

For this particular embodiment, component embodiments of the module, such as the housing, the cover, the bail lever and the actuator, may be fabricated by metallic cast molding. Thus, cover 60, for example, has a shape that may be formed by cutting or bending metal; however, claimed subject matter is, of course, not limited in scope in this respect. As one example, resin molding may alternatively be employed.

Figure 2:
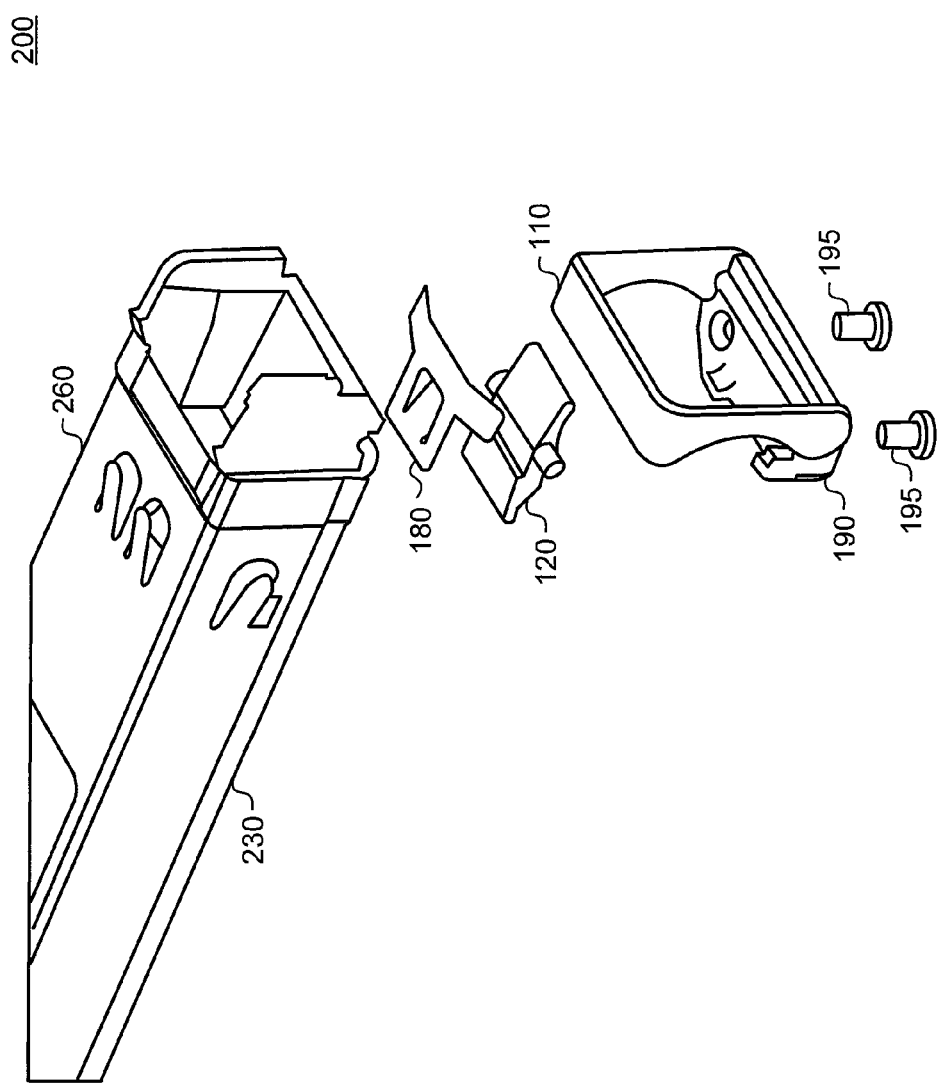
FIGS. 2, 3 and 4 are perspective views of another embodiment of a transceiver module.
Figure 3:
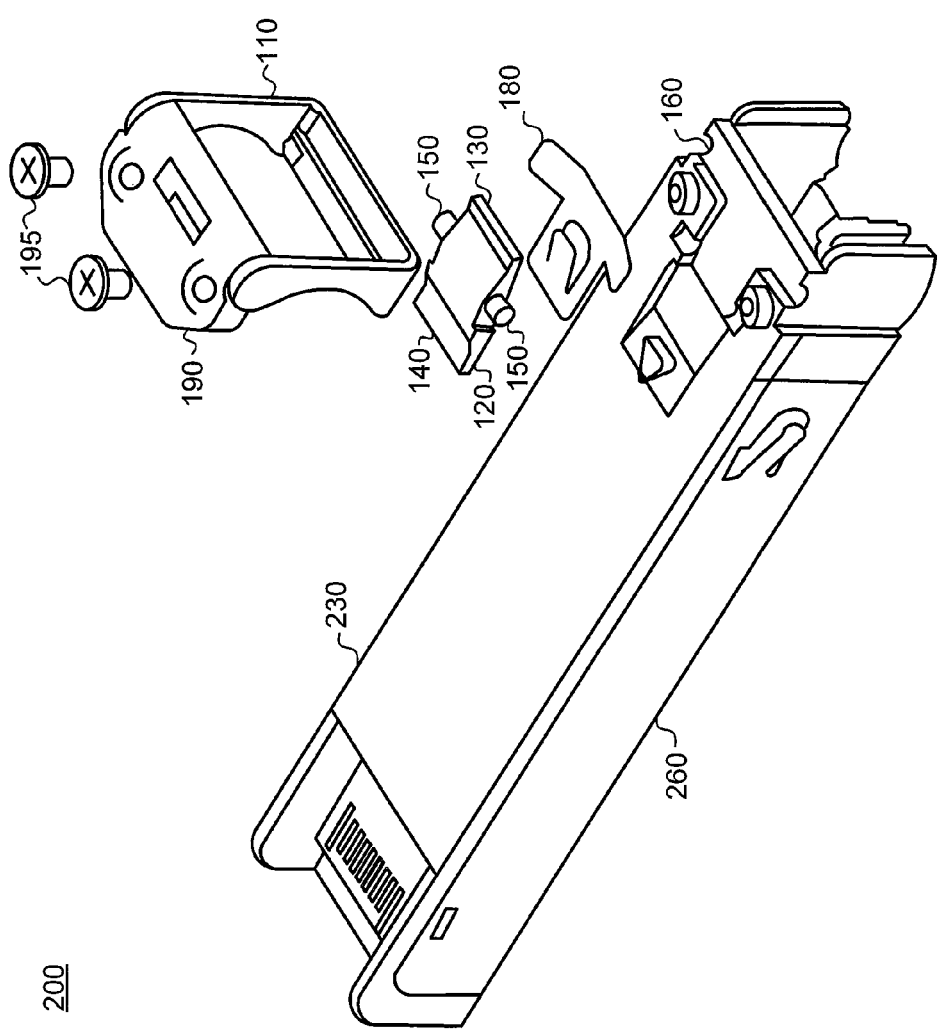
Figure 4:
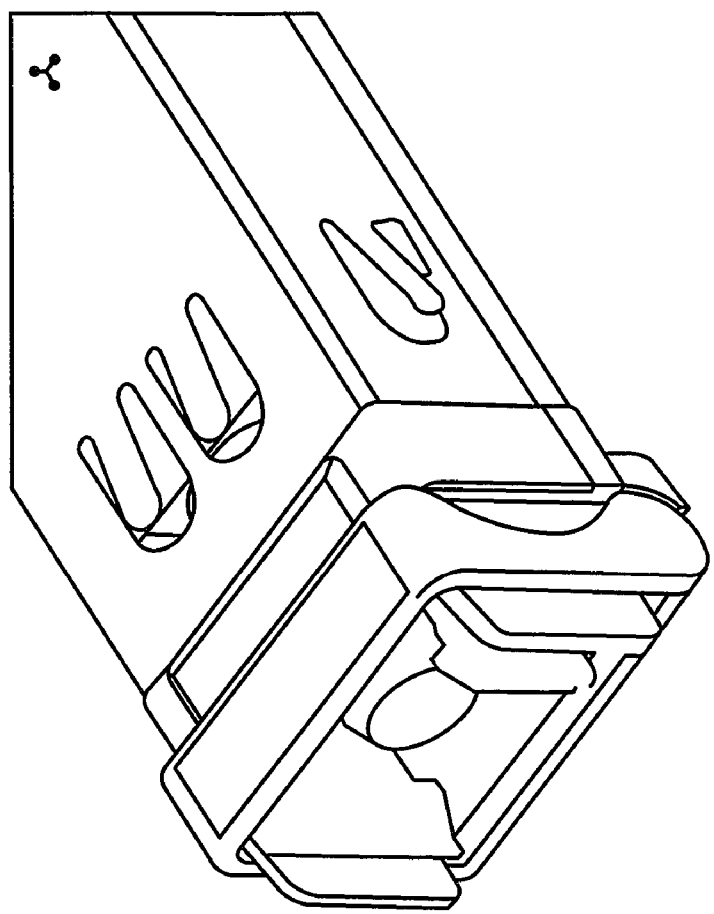

FIGS. 2 and 3 illustrate a similar but alternate embodiment 200 of a transceiver module. Here, embodiment 120 of a seesaw actuator is employed in transceiver module embodiment 200. FIG. 2 shows the module viewed from the top thereof; FIG. 3 shows the module viewed from the bottom. Referring to FIG. 3, actuator 120 has a first end 130 towards the bail lever and a second or opposite end 140 away from the bail lever. Actuator 120 likewise has cylinder like projections 150 shaped so that actuator 120 may rotate about a fulcrum formed by an axial cylinder that includes cylinder like projections 150 if the projections are positioned to be set within grooves or recesses 160 of module housing 230. However, spring 180 is also to be positioned underneath actuator 120 so that actuator 120 holds a steady position if not being actuated by bail lever 110. The operational relationship of components, such as a bail lever and a seesaw actuator, shall be illustrated and explained in more detail below. It is noted that FIG. 4 illustrates embodiment 200 with the various components of the transceiver module assembled.

Figure 5:
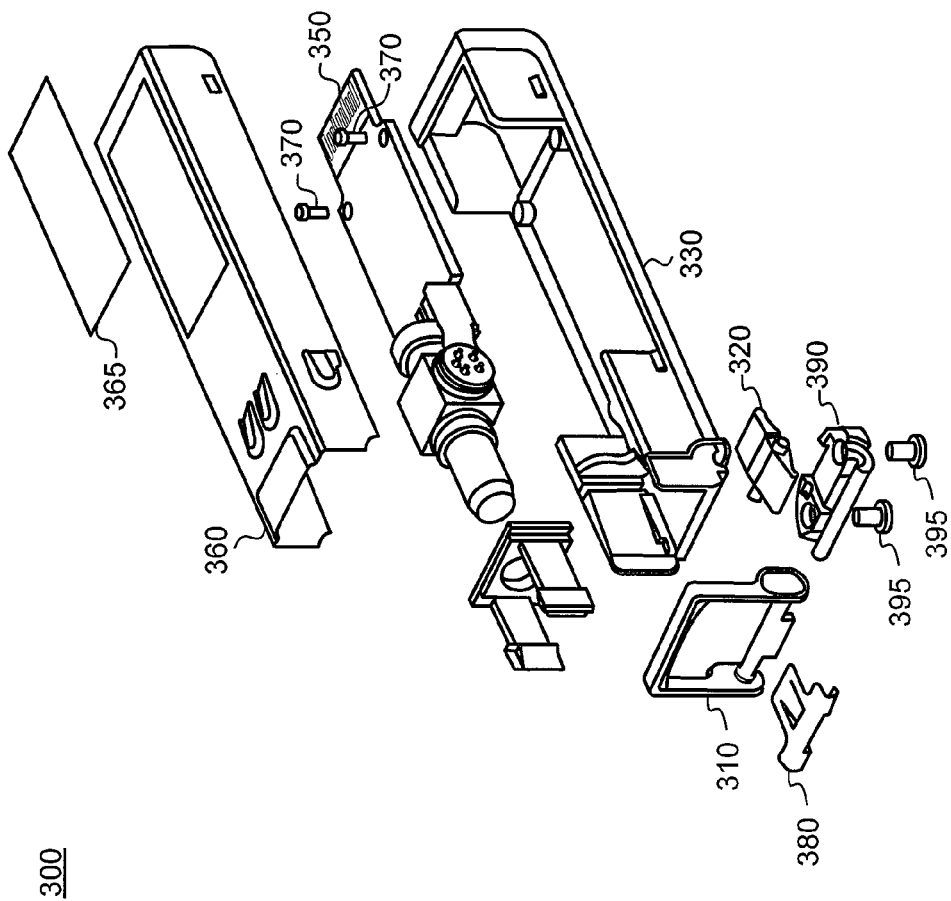
FIGS. 5, 6 and 7 are perspective views of yet another embodiment of a transceiver module.
Figure 6:
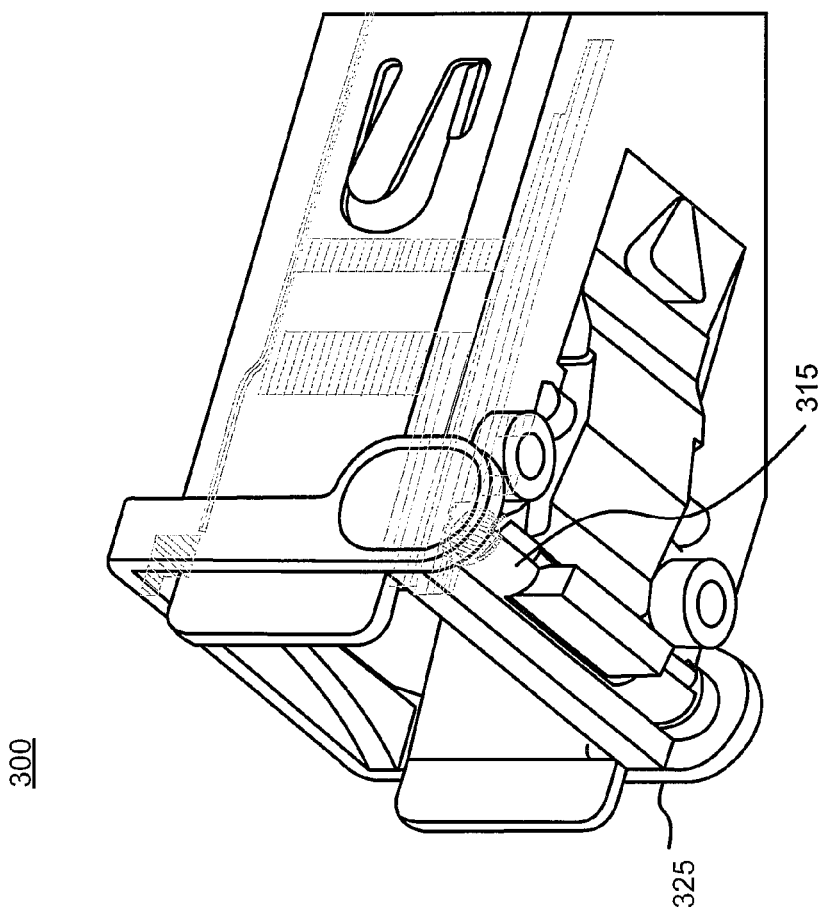
Figure 7:
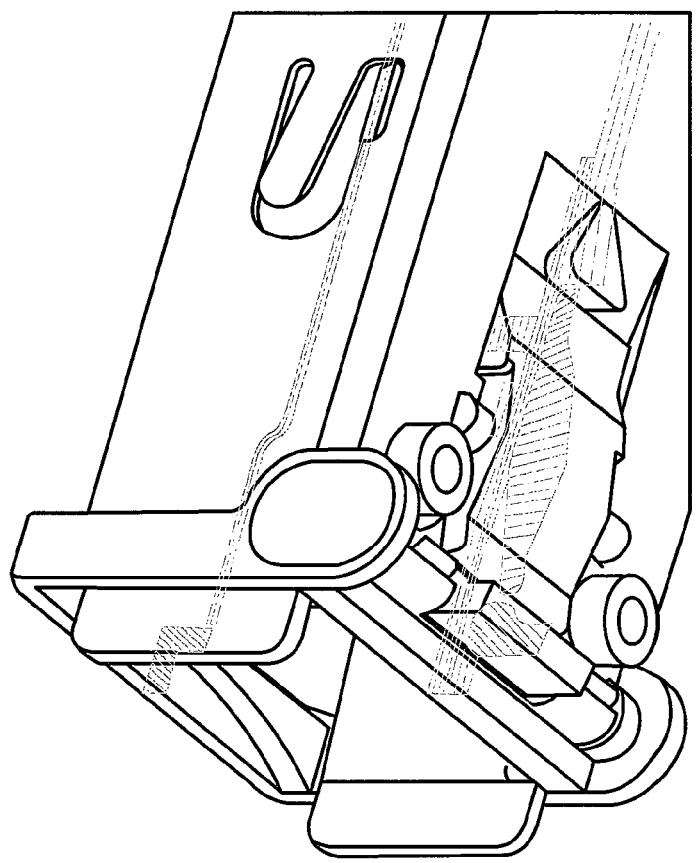

FIGS. 5, 6 and 7 illustrate various perspectives of another embodiment, 300, of a transceiver module. FIG. 5 is an exploded view, similar to the view of embodiment 100 shown in FIG. 1. Embodiment 300 includes similar corresponding components, such as a bail lever 310, an actuator 320, an actuator cover 390, a spring 380, a module housing 330, a module housing cover 360, a printed circuit board (PCB) 350, a label 360 and fasteners 370 and 395. It is noted that for this particular embodiment the optical sub-assembly is different in order to illustrate that a diverse set of optical components may be employed in conjunction with embodiments of a transceiver module in accordance with claimed subject matter.

FIGS. 6 and 7 illustrate cut-away portions of embodiment 300 in perspective from the bottom view of the module housing. Thus, FIG. 6 illustrates an axial cylinder 315 and extending projection 325 that are portions of bail lever 310. FIG. 7 also illustrates projection 325 including a cut away portion. FIG. 6 and 7 both illustrate exposed portions of spring 380 and FIG. 7 also illustrates a cut away portion. Both FIGs illustrate finger 375, which is a portion of cover 360, and actuator 320. Fingers, such as 375, are in general provided to enhance EMI shielding provided by the cover. Both FIGs. also illustrate triangular shaped tab 335, although FIG. 7 includes a cut away portion.

In operation, bail lever 310, as one example, is pivoted about axial cylinder 315 away from module housing 330. As bail lever 310 pivots more, extending projection 325 engages surface-to-surface against a first end of seesaw actuator 320 and exerts a downward force on the actuator. As a result of this downward force, actuator 320 rotates about a fulcrum formed by axial cylinder projections 350. This results in the opposite or other end of actuator 320 exerting an upward force as that end of actuator 320 moves away from the module housing. Typically (not shown), a cage or receptacle will have a flexible latching finger or latching projection having a shape cut out of it so that it fits over triangular shaped tab 335 and latches with or to the module housing. Therefore, the upward force of the end of actuator 320 that is moving away from the module housing flexes the flexible latching finger or projection so that the transceiver module may be de-latched from the cage or receptacle.

A de-latching mechanism, such as embodiment 300, provides several advantages. In general, it is relatively easy to assemble or troubleshoot, which reduces manufacturing costs for a transceiver module. In addition, in an environment in which smaller size is desirable, this particular embodiment is relatively compact. As the previous discussion illustrates, the embodiment operates in a type of rotation-to-rotation movement since bail lever 310 pivots to engage actuator 320 so that actuator 320 rotates. Other mechanisms that employ linear motion, therefore, may not be as compact. Furthermore, this double-type lever operation for this embodiment is such that a relatively small force applied to pivot the bail lever may produce a relatively larger force applied to flex the latching finger or latching projection of a cage or other receptacle. Likewise, it should now be appreciated that the angles of movement by the extending projection of the bail lever and the seesaw actuator may be adjusted depending at least in part upon the particular embodiment so that the ratio of the force applied to the force realized is a desirable one for the particular situation.

Figure 21:
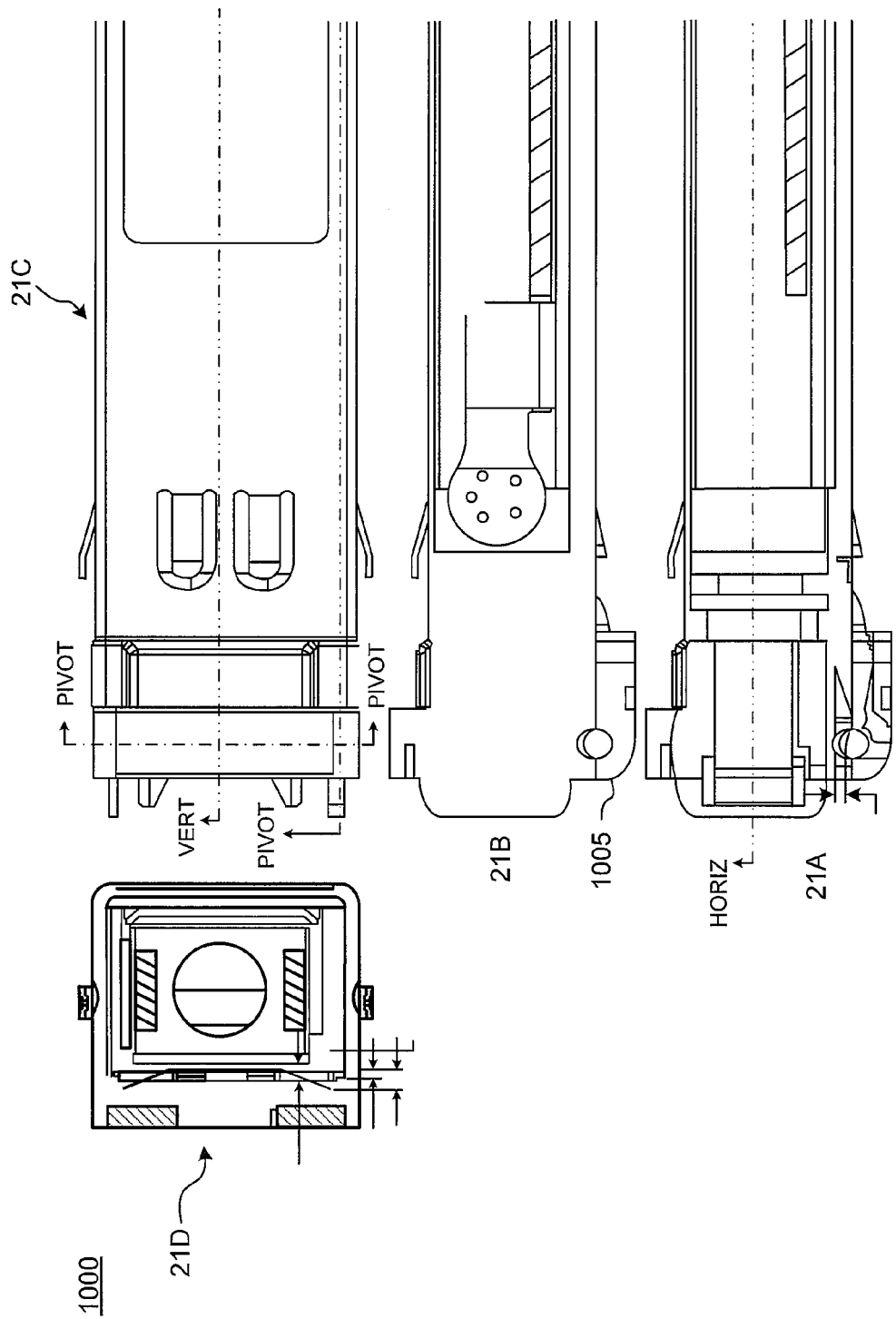
FIG. 21 is a sketch that provides various views of one more embodiment of a transceiver module.

FIG. 21 is a sketch that illustrates various views, e.g., sides A and B, top C and front D, of another embodiment 1000 of an optical transceiver module. This particular embodiment operates in the matter previously described, such as with respect to embodiment 300. Likewise, this particular transceiver embodiment includes an embodiment of a bail lever that is shorter, for example, from the bottom of the module to the top of the module than, for example, the bail lever embodiment 410 of transceiver module embodiment 400 shown in FIG. 8. One advantage of employing an embodiment with a bail lever that is not as long as embodiment 410 relates to use of an optical transceiver in connection with telecommunications, rather than data communications. In telecommunications, it is common to install a transceiver at an angle, for example, rather than having it level. One reason is a safety concern regarding the laser beam with respect to personnel that may be nearby, for example. However, if transceivers are installed at an angle, face plates or bezels for such configurations are manufactured that are zigzagged. Manufacturing face plates in this manner may add complexity and, therefore, cost. However, employing a shorter bail lever handles the angle adjustment without a need for a zigzagged bezel or face plate. More specifically, with a short bail lever, the profile of the module is smaller. A shorter bail lever can operate with a zigzagged face plate or a face plate that is not zigzagged. Therefore, a zigzagged face plate is not necessarily needed, potentially resulting in manufacturing cost savings.

It is also noted that embodiment 1000 also employs a spring 1080, such as illustrated in connection with other embodiments, such as 100, 200, and 300. For these embodiments, a spring, such as 1080, for example, operates to retain a bail lever in place if the bail lever is in a vertical position or neutral position in which it is not being pivoted away from the module housing and, therefore, is not in direct physical contact with an actuator. Likewise, grooves, such as 1010, for example, are oval shaped. Therefore, the spring provides flexing in this direction so that there is additional tolerance; however, as the lever is pivoted more and more off of a vertical position, groove 1010, for example, provides less additional tolerance.

A transceiver module embodiment that employs the particular feature just described is believed to provide several advantages. This approach should result in smoother action during pivoting of the bail lever. Likewise, that may reduce wear and tear on the bail lever itself. Likewise, as suggested above, employing a spring to provide flexing in a vertical direction also tends to hold the bail lever in place in the vertical position. Therefore, the lever is solidly in place, which may, for example, potentially reduce rattling or other undesired effects if the lever were looser.

Figure 8:
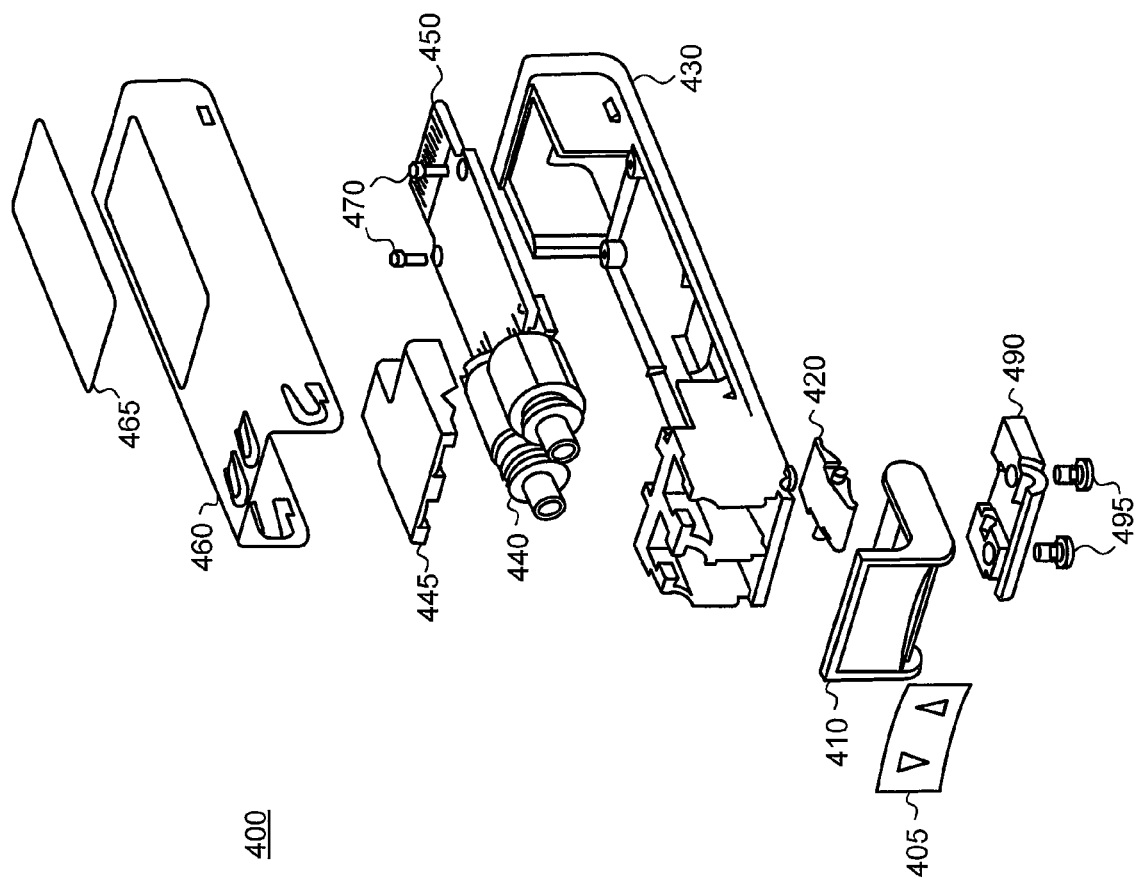
FIGS. 8, 9, 10 and 11 are perspective views of still another embodiment of a transceiver module.
Figure 9:
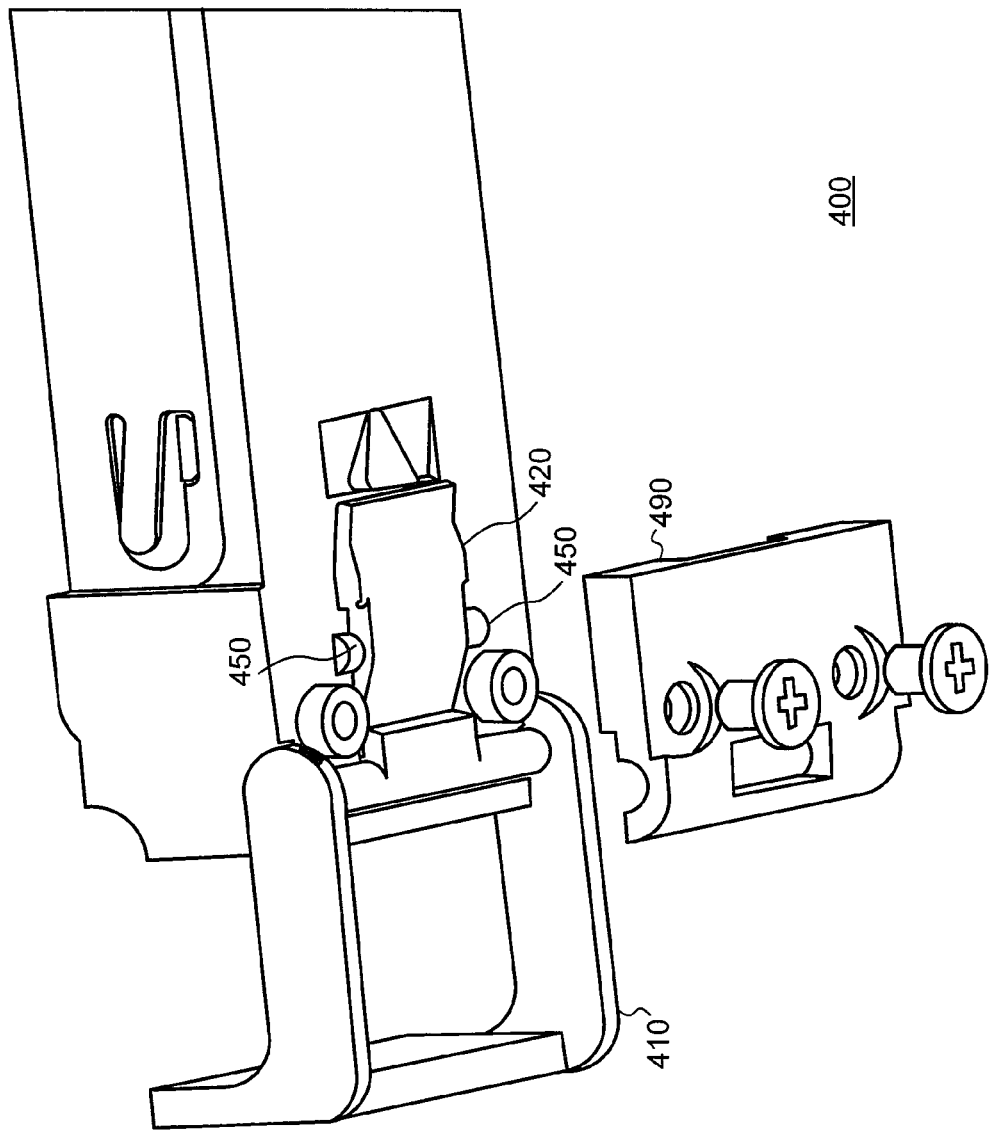
Figure 10:
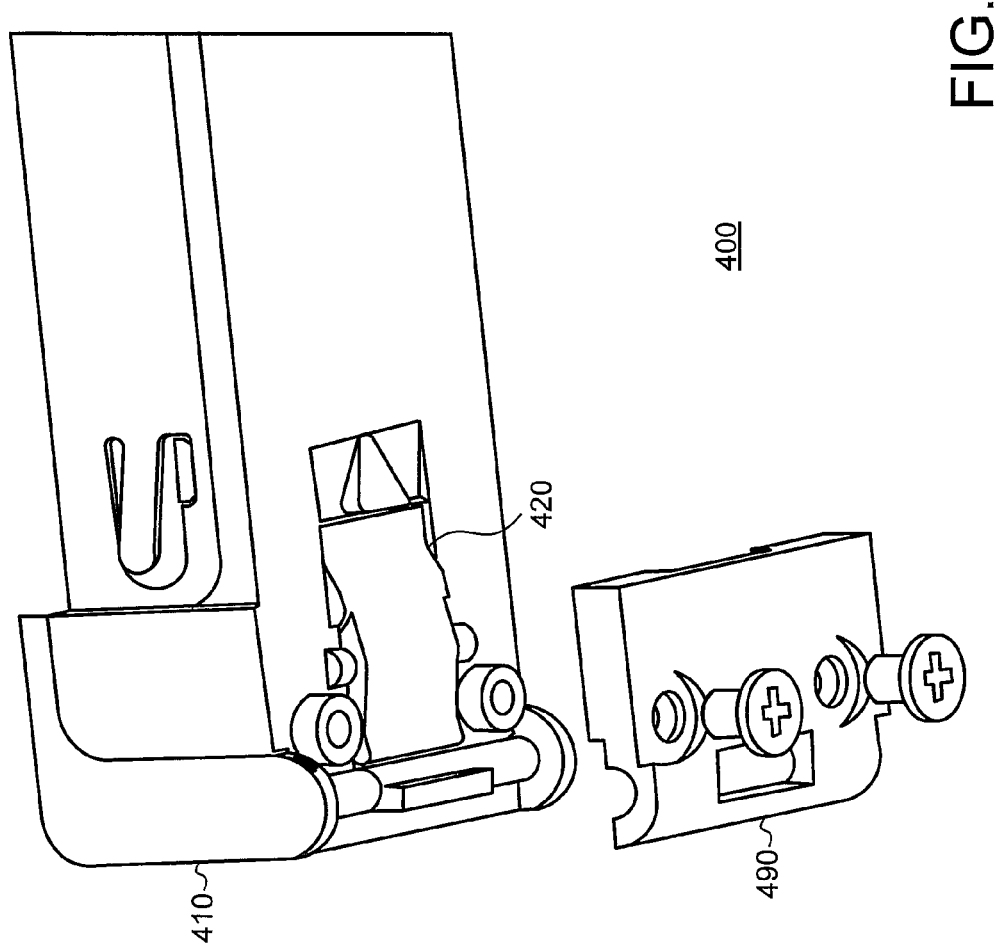

FIGS. 8, 9, 10 and 11 illustrate yet another embodiment 400 of a transceiver module. This particular transceiver module embodiment includes an embodiment of a bail lever, as suggested above, in which the bail lever is not shortened to reduce transceiver module profile. It is likewise noted that this particular embodiment employs two optical sub-assemblies, a receiver (ROSA) and a transmitter (TOSA). Of course, as previously, claimed subject matter is not limited to a particular embodiment. However, here, FIG. 8 is a perspective exploded view, while FIGS. 9 and 10 illustrate operation of these particular embodiments of the bail lever and actuator components, here, 410 and 420, respectively, for non-shortened bail lever. These latter figures also illustrate this particular embodiment of an actuator cover, here 490. FIG. 9 illustrates bail lever 410 in a neutral position in which it is not engaged with actuator 420; however, FIG. 10 illustrates these components in a situation in which bail lever 410 has been sufficiently pivoted so that it engages actuator 420 to rotate about a fulcrum formed by axial cylinder projections 450. It is noted that this particular embodiment likewise does not employ a spring.

Figure 11:
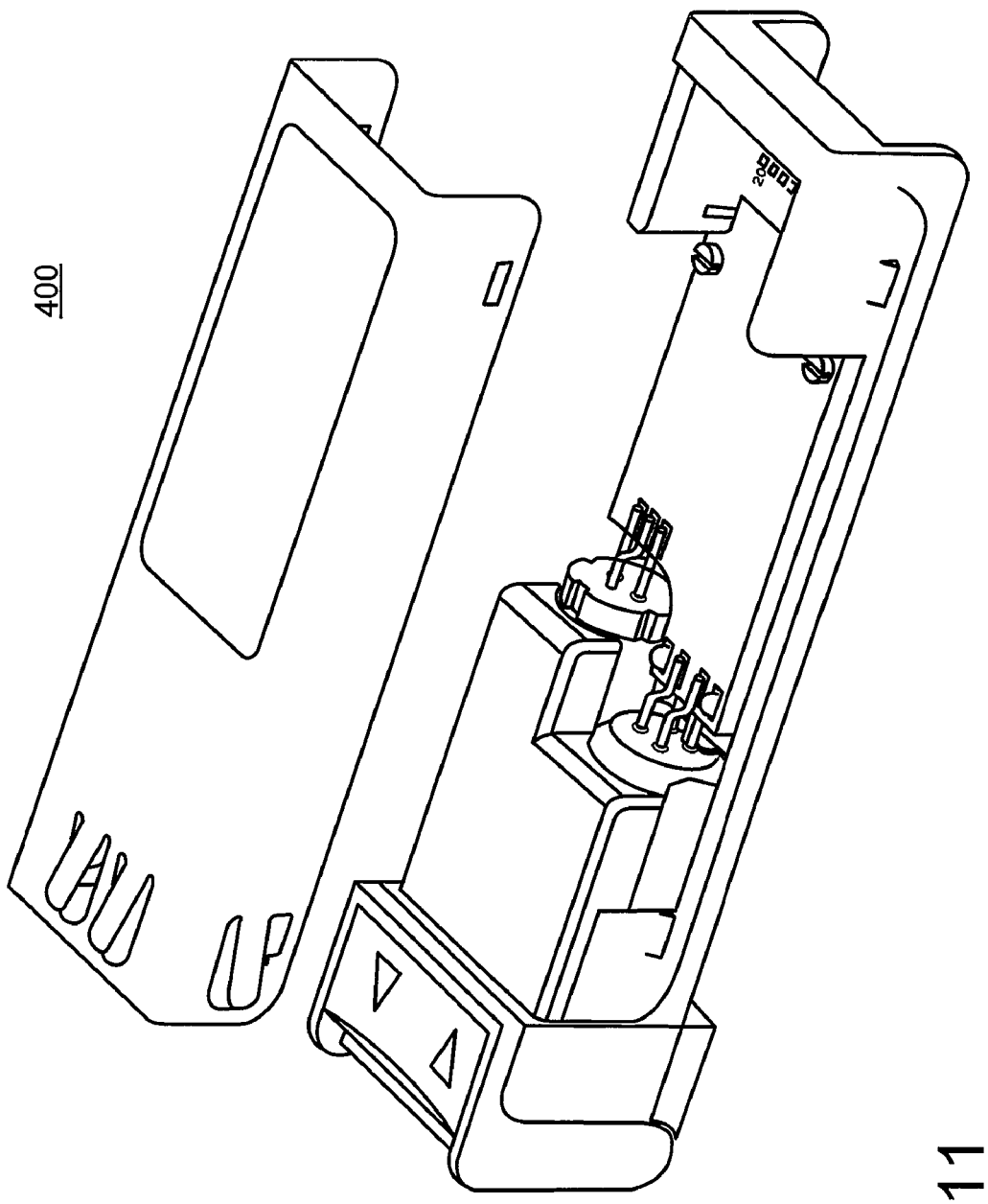

FIG. 11 illustrates embodiment 400 assembled, but without module housing cover 460 in place. Thus, embodiment 400 illustrates a transceiver module employing a Z-drop configuration. In this context, this terminology refers to a configuration in which one does not need to flip the transceiver module over for access to the PCB. Employing this particular configuration for this particular embodiment provides several advantages. It is relatively easier to manufacture, probe, test, disassemble, inspect and repair than the alternate flip configuration. Visibility of the PCB contributes to this aspect of a Z-drop configuration. Thus, these operations should take less time than for a flip configuration, which may reduce manufacturing costs. Likewise, in a flip configuration, it is possible that more heat may flow towards the module housing cover than in a Z-drop configuration. Thus, a flip configuration may result in a module housing cover that is more expensive to manufacture to address potential thermal concerns. Furthermore, EMI shielding for an embodiment employing a Z-drop configuration should also be cheaper to manufacture since it may be accomplished with a single cover piece rather than multiple pieces, as with a more complex configuration.

Figure 12:
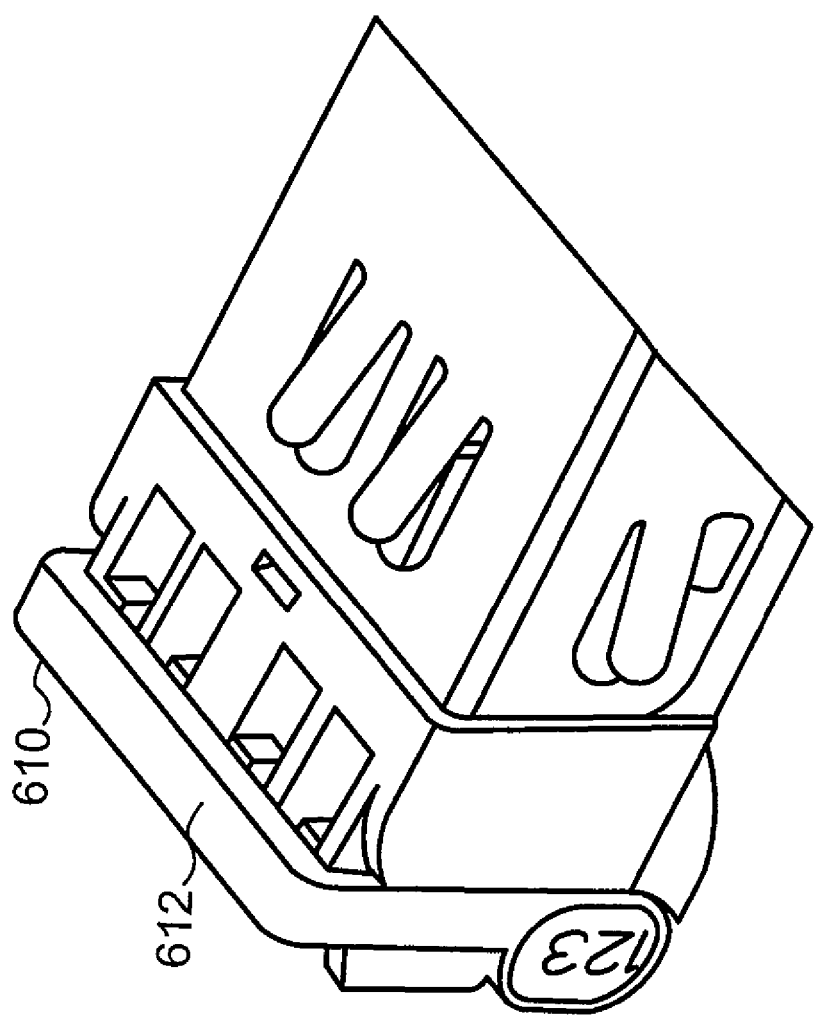
FIGS. 12 to 20 are perspective views of various embodiments of a bail lever.
Figure 13:
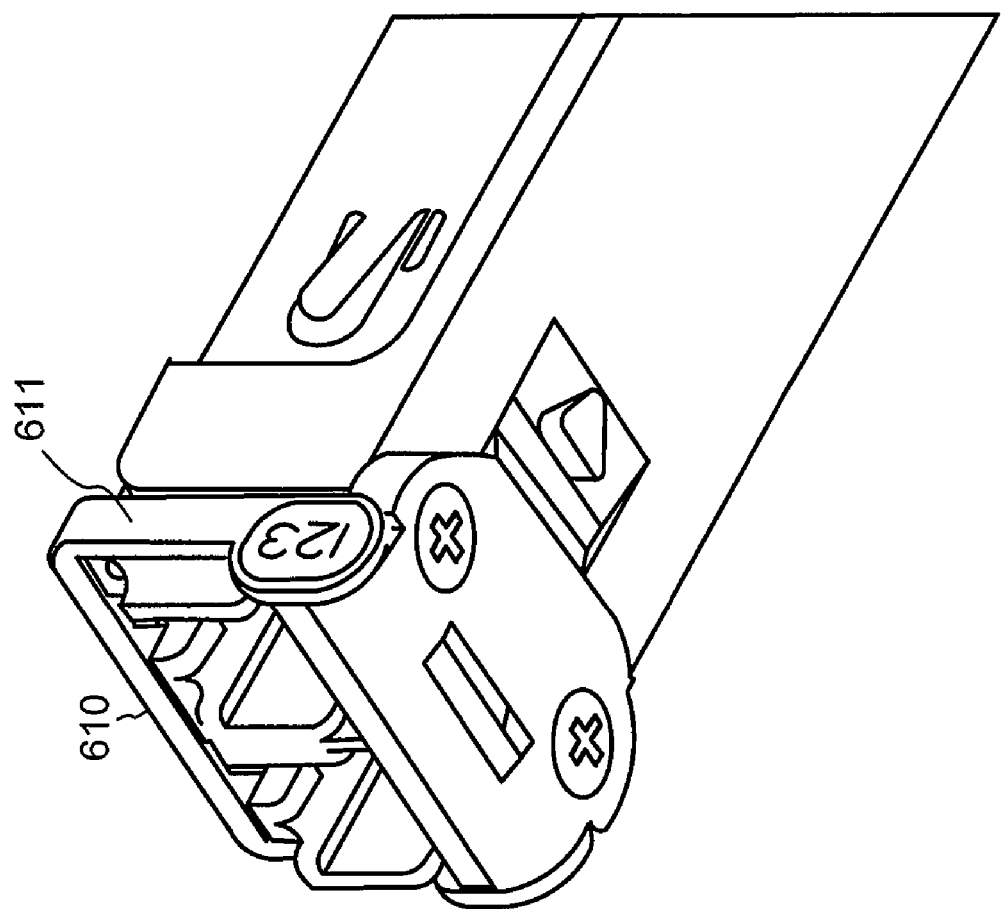
Figure 14:
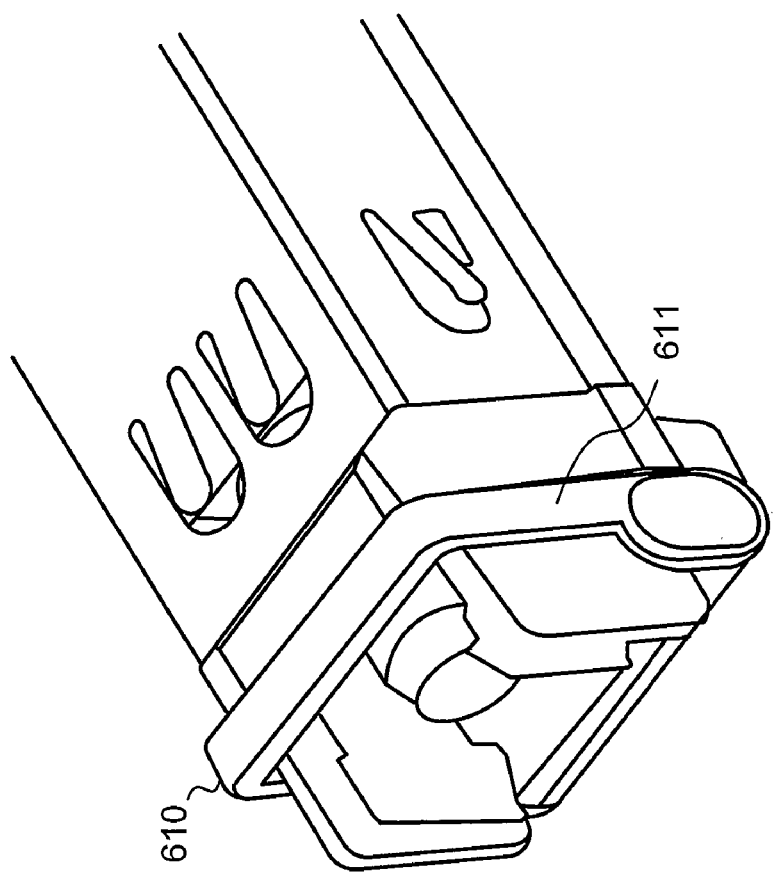

It is noted, of course, that claimed subject matter is not limited in scope to a particular embodiment of a bail lever. Therefore, the previously described embodiments have illustrated a variety of bail levers with a variety of features. FIGS. 12 to 20 illustrate other such bail levers as well. For example, FIGS. 12, 13 and 14 illustrate an embodiment 610 of a bail lever similar in shape to embodiment 310 shown in FIGS. 5, 6 and 7.

Although claimed subject matter is not limited in scope to embodiment 610, for example, nonetheless, we will discuss this embodiment as a representative example. As shown, this particular embodiment has a so-called U-shaped configuration that comprises a pair of legs 611 and a bridge 612 connecting legs 611. Although this particular embodiment is made of metal, claimed subject matter is not limited in scope in this respect. For example, a bail lever may be made out of resin or plastic. Bridge 12 forms an opening for optical assemblies to transmit optical signals, such as if the optical transceiver is plugged into a host receptacle.

The legs of the bail lever in this embodiment are also joined or connected by an axial cylinder that is substantially parallel to the bridge. In operation, the bail lever may be pivoted about this axial cylinder away from the module housing to engage surface-to-surface with an actuator, as previously discussed.

It is noted that embodiment 610 includes a side label, denoting "123," affixed to an axial cylinder portion of the bail lever. Although claimed subject matter is not limited in scope in this respect, it may be convenient to employ bail labels with different markings, different colors and the like to identify transceiver modules of different capabilities. For example, it may be convenient to identify wavelengths of the particular optical signals produced, power for the transceiver (which is typically related to transmission distance), or number of channels for the transceiver, to provide only a few possible examples.

Figure 15:
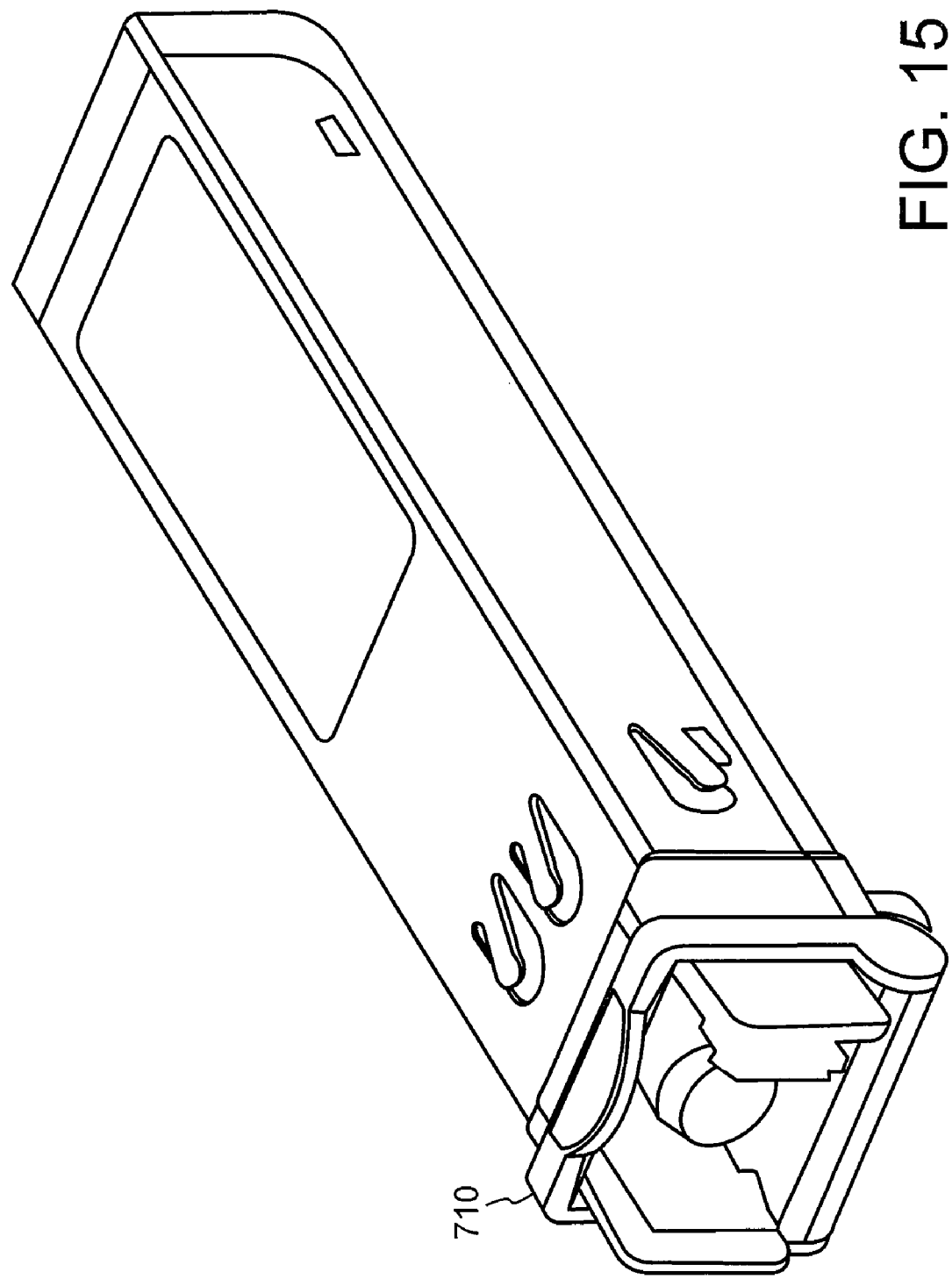
Figure 16:
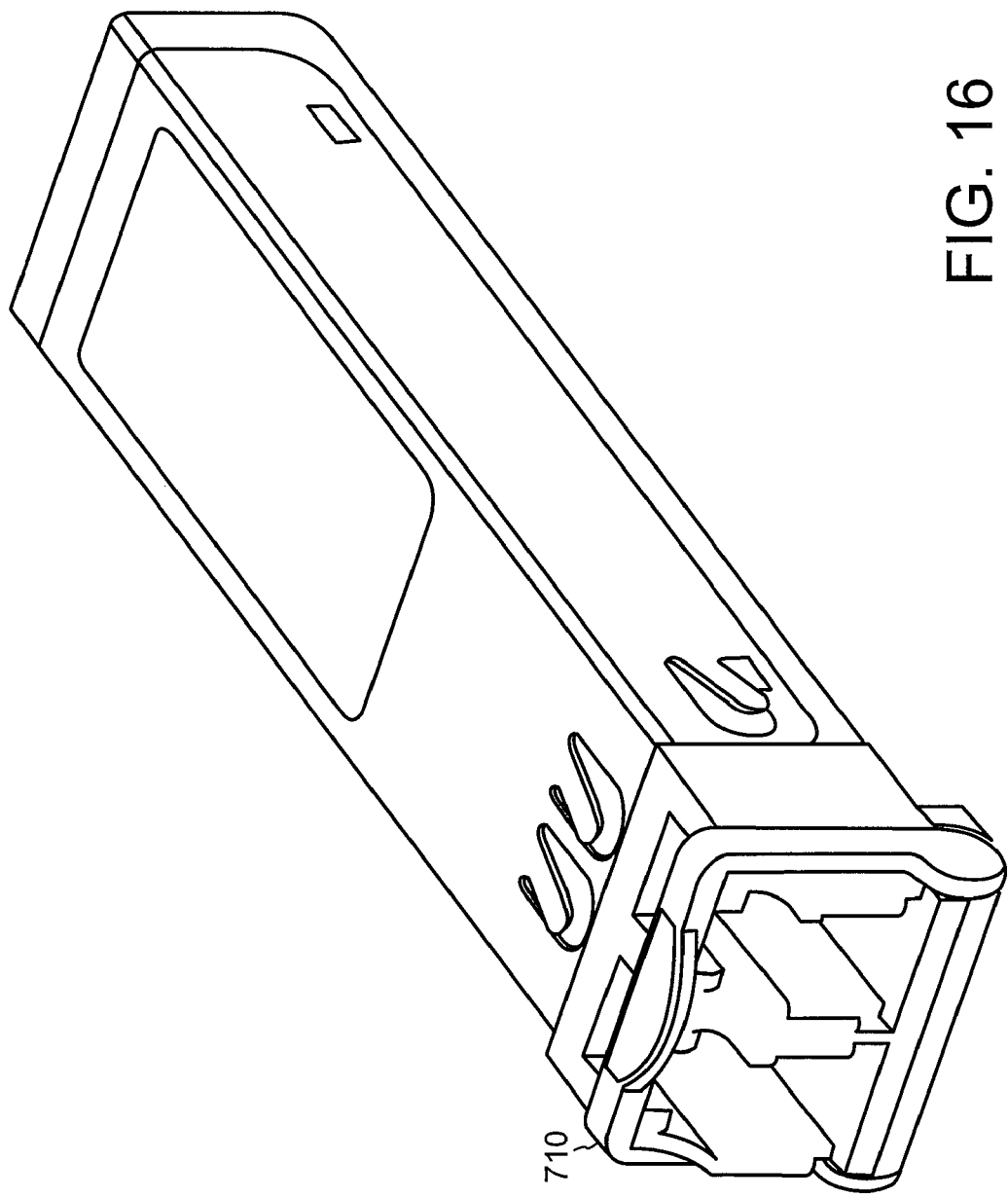
Figure 17:
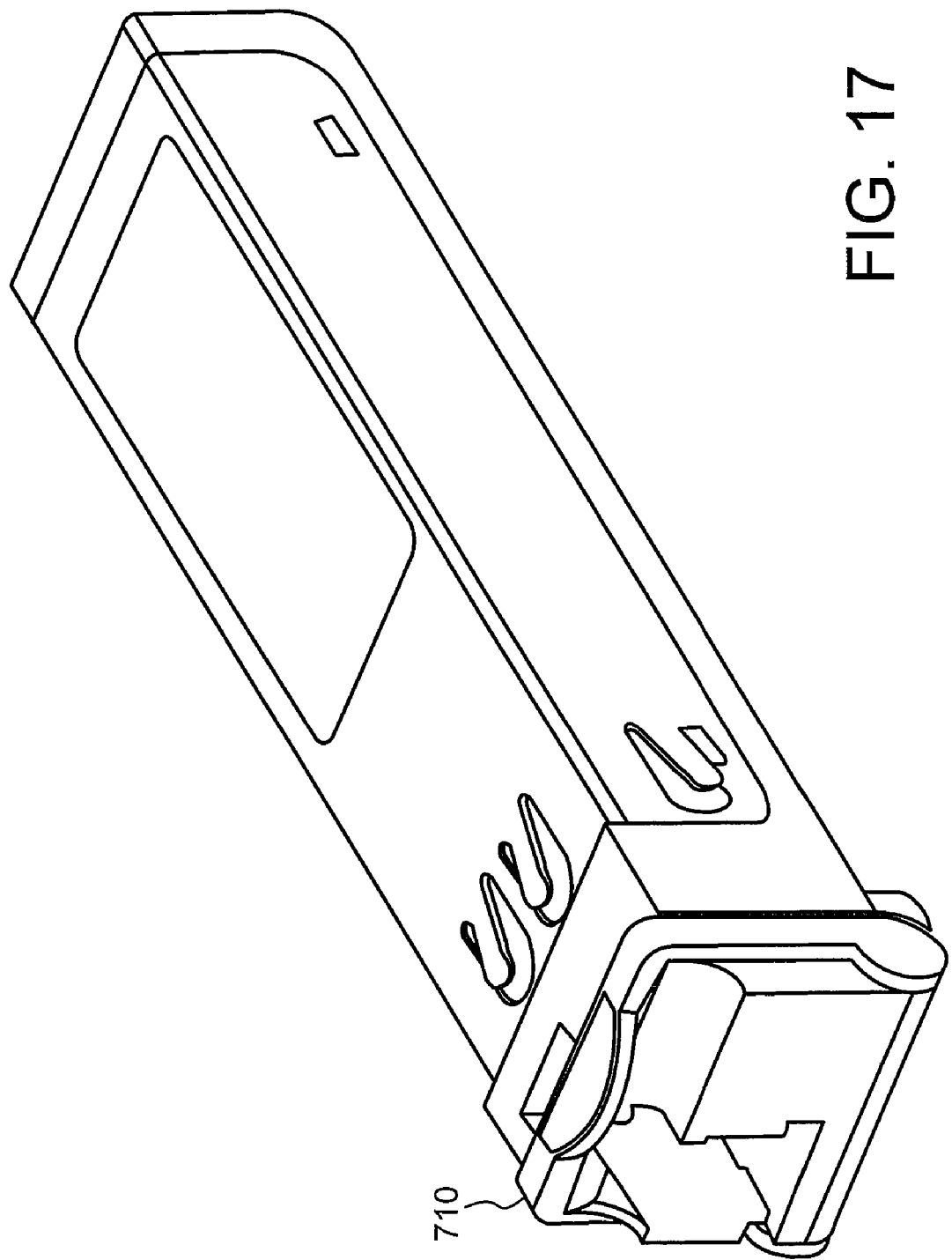
Figure 18:
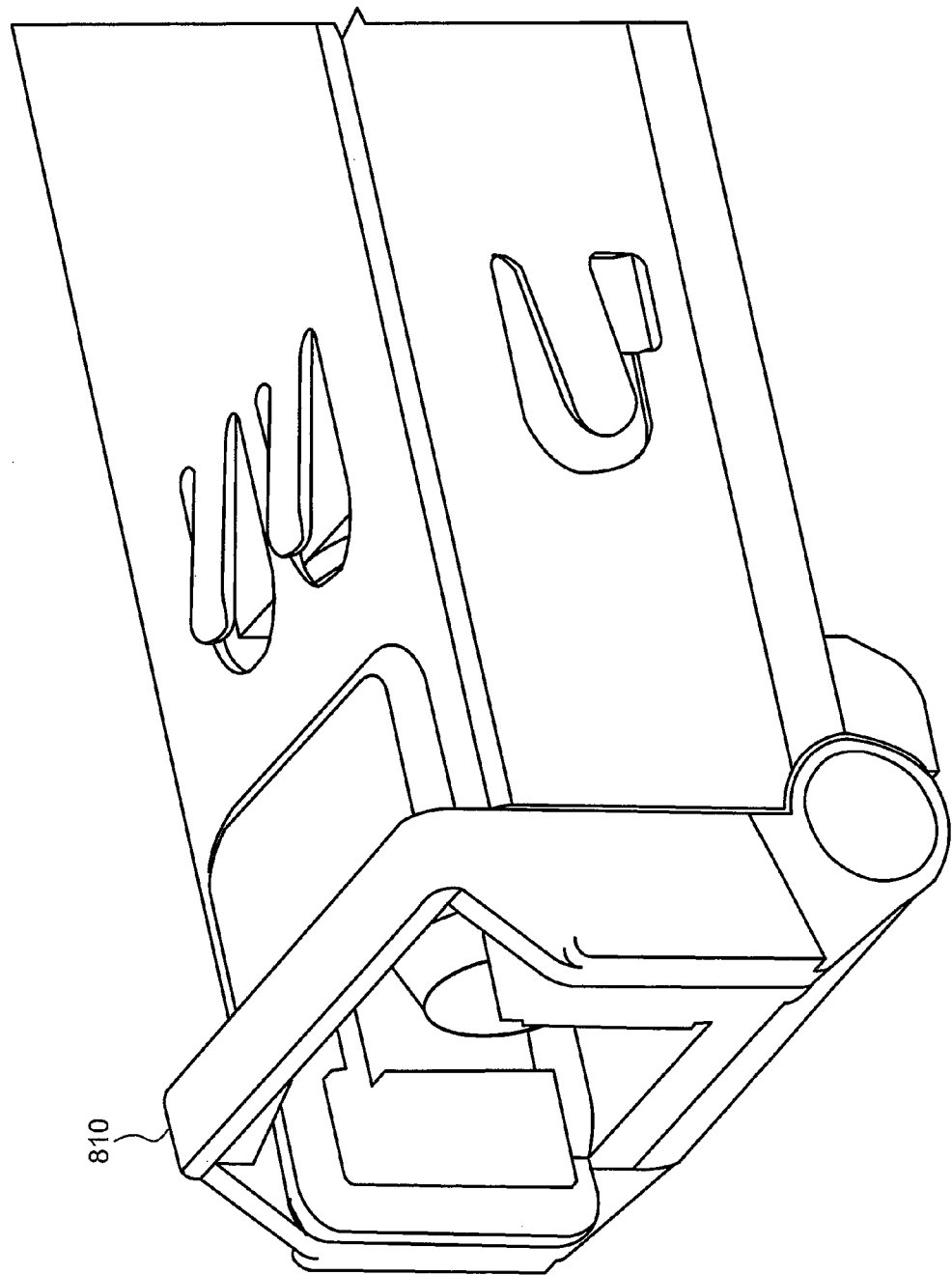
Figure 19:
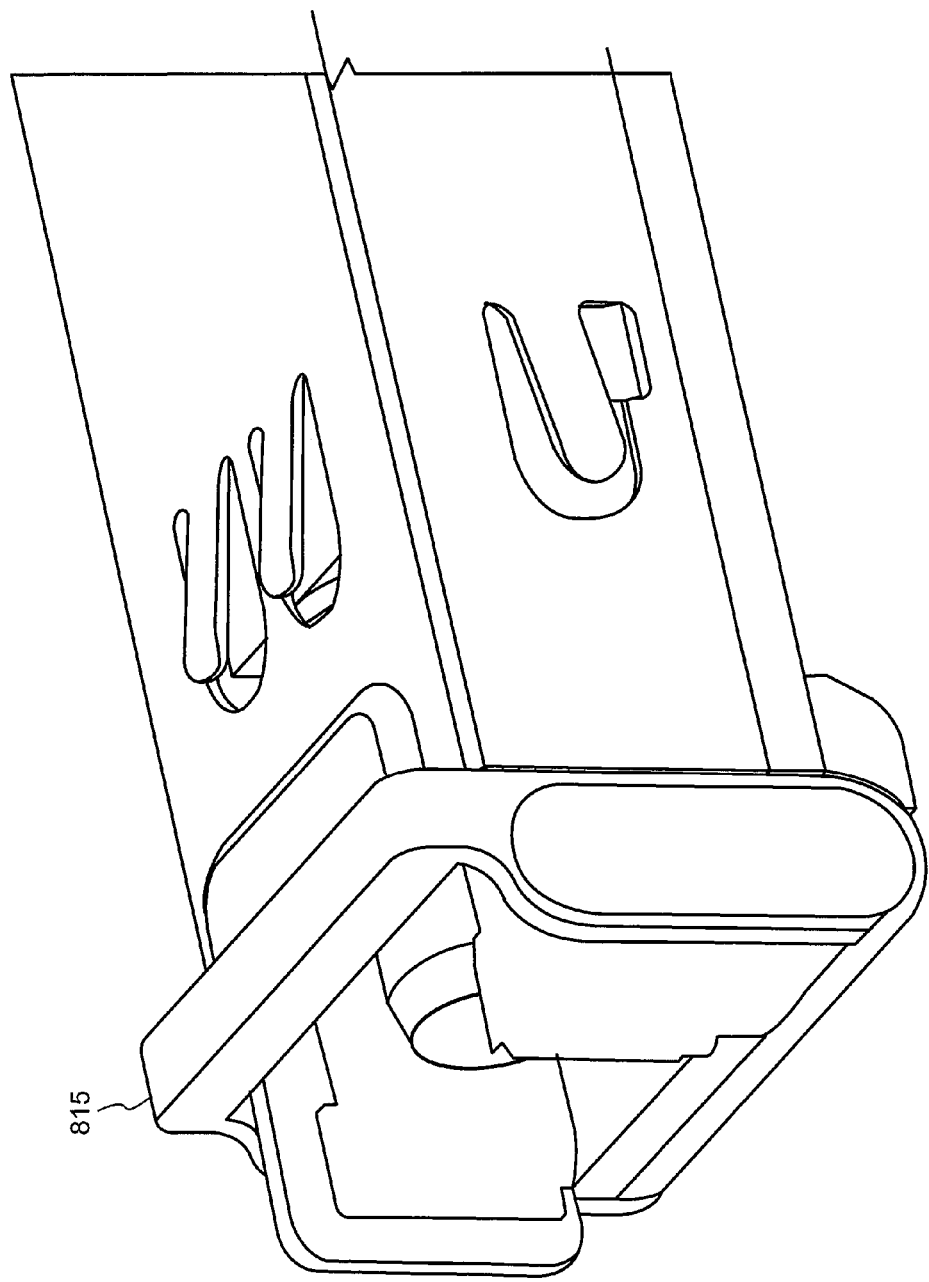
Figure 20:
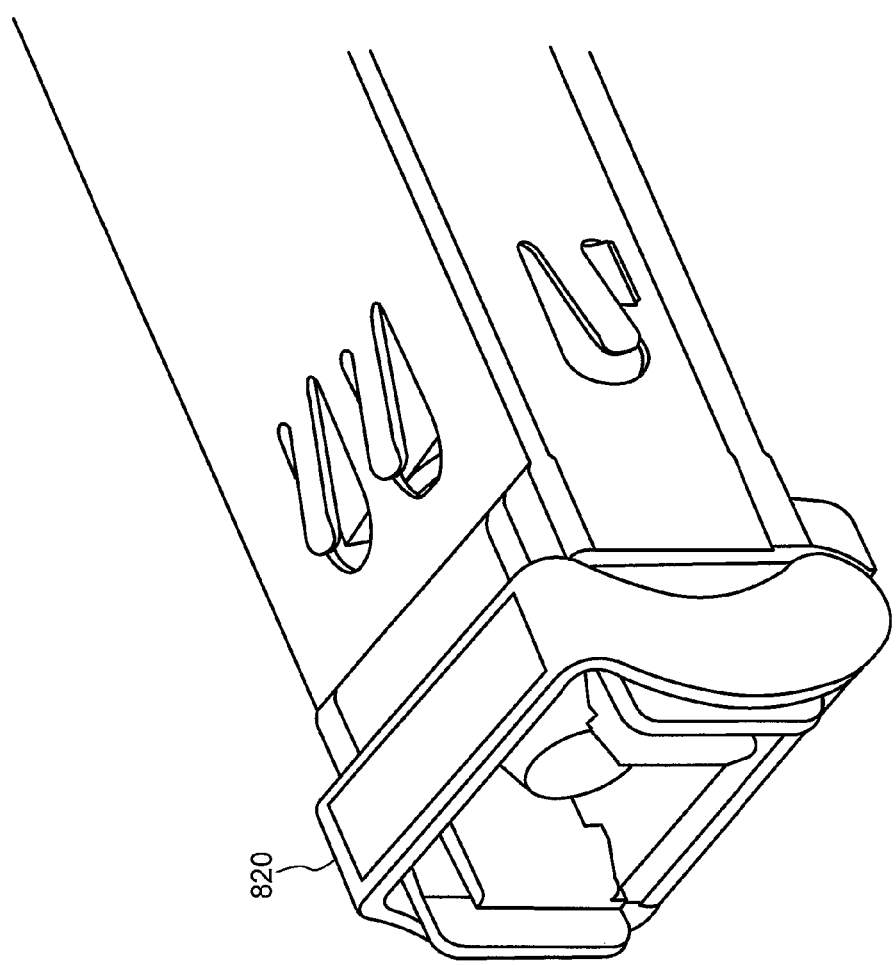

FIGS. 15, 16 and 17 illustrate another embodiment of a bail lever, here 710. Bail lever 710 is illustrated being employed with different optical transceivers having different optical assemblies. Likewise, for this particular embodiment, a label is affixed to the handle portion of the bail lever, rather than being a side label, as shown in FIGS. 12, 13, and 14. Likewise, FIGS. 18, 19 and 20 show additional alternate embodiments 810, 815 and 820 of bail levers having various shapes and various labels in various locations. It is noted that embodiment 820 has some features in common with embodiment 110 shown in FIGS. 1, 2, 3 and 4.

Although claimed subject matter is not limited in scope in this respect, referring to, for example, FIG. 8, assembly of a transceiver module may include the following. Optical assembly 440, which includes a ROSA and a TOSA, may be placed or dropped into module housing 430. Attached to this optical assembly is PCB 450. The PCB may be secured by fasteners 470. Likewise, optical assembly cover 445 may be lowered into place.

Next, actuator 420 may be placed so that its axial cylinder projections, as previously described, sit in recesses or grooves of the module housing; however, in an embodiment employing a spring, the spring may be inserted prior to the actuator being placed or positioned. Similar, for this particular embodiment, bail lever 410 is also positioned in a groove or recess of the module housing, here so that it may pivot about its axial cylinder connecting or joining its two legs. A protective cover for the actuator-bail lever mechanism, here 490, may be applied to the module housing and secured by fasteners 495. Likewise, a label 405 may be positioned on the bridge of the bail lever. To complete the assembly, cover 460 may be lowered onto the module housing and label 465 may be affixed to the outside of the cover.

It will, of course, be understood that, although particular embodiments have just been described, claimed subject matter is not limited in scope to a particular embodiment or implementation. For example, one embodiment may be in hardware, such as implemented to operate as part of a system or with a combination of devices, for example, whereas another embodiment may be implemented to operate in conjunction with or as part of any combination of hardware, software or firmware, for example. Likewise, although claimed subject matter is not limited in scope in this respect, one embodiment may also include one or more articles, such as a storage medium or storage media. As another potential example, an embodiment may be implemented with or as part of a computing platform, which may include one or more processing units or processors, one or more input/output devices, such as a display, a keyboard and/or a mouse, and/or one or more memories, such as static random access memory, dynamic random access memory, flash memory, and/or a hard drive. It is also worth noting that embodiments of claimed subject matter may be employed in a variety of contexts. Thus, claimed subject matter is not limited to implementation in a data communication or a voice communication network. Again, as previously indicated, many other approaches to implementation via software, firmware or hardware are included within the scope of claimed subject matter.

In the preceding description, various aspects of claimed subject matter have been described. For purposes of explanation, specific numbers, systems or configurations were set forth to provide a thorough understanding of claimed subject matter. However, it should be apparent to one skilled in the art having the benefit of this disclosure that claimed subject matter may be practiced without the specific details. In other instances, well-known features were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. A transceiver module comprising:
   a module housing;
   a bail lever;
   an actuator; and a spring adjacent to said actuator;
   wherein said bail lever and said actuator are movably connected to said module housing in such a manner that pivoting said bail lever away from said housing engages an end of said actuator to move towards said module housing so that said actuator rotates about a fulcrum with an opposing end of said actuator moving away from said module housing.

2. The transceiver module of claim 1, wherein said transceiver comprises a form pluggable transceiver module capable of disengagement from a host receptacle.

3. The transceiver module of claim 2, wherein said transceiver module comprises an SFP transceiver module.

4. The transceiver module of claim 1, and further comprising a host receptacle, said host receptacle including a flexible latching extension to latch said transceiver module securely into place with said host receptacle;
   wherein said opposing end of said actuator during pivoting of said bail lever away from said housing is operable to contact and flex said latching extension of said host receptacle to de-latch said module housing from said host receptacle.

5. The transceiver module of claim 4, wherein said module housing is oriented so as to receive a printed circuit board to be mounted within said module housing in a Z-drop configuration.

6. The transceiver module of claim 5, including a cover for said module housing to provide EMI shielding.

7. The transceiver module of claim 1, wherein said bail lever has a sufficiently short profile so that said transceiver module is operable with a flat bezel or a zigzagged bezel.

8. A method of disengaging a transceiver module from a host receptacle comprising:
   flexing a latching projection of said host receptacle away from said transceiver module via a seesaw actuator and a spring adjacent said actuator; and
   pivoting a bail lever to apply a downward force on one end of said actuator so that the other end contacts said latching projection and applies an upward force.

9. The transceiver module of claim 1, wherein said spring is operable to provide flexing tolerance to said bail lever.

10. A form pluggable transceiver module capable of being disengaged from a host receptacle comprising:
    a module housing and a cover for said module housing;
    a bail lever pivotally connected to said module housing;
    a seesaw actuator rotatably connected to said module housing about a fulcrum; and
    a spring adjacent said actuator;
    said module housing being oriented so as to receive a printed circuit board to be mounted within said module housing in a Z-drop configuration;
    said bail lever and said seesaw actuator being positioned relative to each other so that pivoting of said bail lever away from said module housing results in an extending projection of said bail lever to be engaged surface-to-surface against one end of said seesaw actuator;
    said bail lever and said seesaw actuator being positioned relative to each other so that further pivoting beyond surface-to-surface engagement exerts a downward force on said one end of said actuator resulting in rotation of said actuator about said fulcrum and exertion of an upward force on an opposite end of said actuator so as to contact and flex a latching extension of said host receptacle away from said module housing and thereby de-latch said module housing from said host receptacle.

11. An apparatus comprising: a transceiver module, said transceiver module including a module housing, a bail lever; and means for de-latching said transceiver from a host receptacle; wherein said means for de-latching includes an actuator and a spring adjacent said actuator; and wherein said means for de-latching comprises a seesaw actuator movably connected to said module housing in such a manner that pivoting said bail lever away from said housing engages an end of said actuator to move towards said module housing so that said actuator rotates about a fulcrum with an opposing end of said actuator moving away from said module housing.

12. The transceiver module of claim 10, wherein said bail lever has a sufficiently short profile so that said transceiver module is operable with a flat bezel or a zigzagged bezel.

13. The transceiver module of claim 10, wherein said spring is operable to provide flexing tolerance to said bail lever.

* * * * *

UNITED STATES PATENT AND TRADEMARK OFFICE
CERTIFICATE OF CORRECTION

PATENT NO. : 7,766,686 B2 Page 1 of 1
APPLICATION NO. : 12/008094
DATED : August 3, 2010
INVENTOR(S) : Xiao-Bai Gu It is certified that error appears in the above-identified patent and that said Letters Patent is hereby corrected as shown below:

Title page, col. 2, item [74] reads "Attorney, Agent or Firm-Norman Kinsella; Grossman, Tucker, Perrault & Pfleger PLLC" kindly replace with -- Berkeley Law & Technology Group, LLP --

Signed and Sealed this

Twelfth Day of October, 2010

David J. Kappos
*Director of the United States Patent and Trademark Office*